US009621568B2

(12) United States Patent
Shieh

(10) Patent No.: US 9,621,568 B2
(45) Date of Patent: Apr. 11, 2017

(54) SYSTEMS AND METHODS FOR DISTRIBUTED THREAT DETECTION IN A COMPUTER NETWORK

(71) Applicant: Choung-Yaw Michael Shieh, Palo Alto, CA (US)

(72) Inventor: Choung-Yaw Michael Shieh, Palo Alto, CA (US)

(73) Assignee: VARMOUR NETWORKS, INC., Mountain View, CA (US)

( * ) Notice: Subject to any disclaimer, the term of this patent is extended or adjusted under 35 U.S.C. 154(b) by 68 days.

(21) Appl. No.: 14/480,318

(22) Filed: Sep. 8, 2014

(65) Prior Publication Data

US 2015/0229656 A1  Aug. 13, 2015

Related U.S. Application Data

(60) Provisional application No. 61/965,981, filed on Feb. 11, 2014.

(51) Int. Cl.
*H04L 29/06* (2006.01)
(52) U.S. Cl.
CPC ...... *H04L 63/1408* (2013.01); *H04L 63/1491* (2013.01); *H04L 63/145* (2013.01); *H04L 63/1433* (2013.01)
(58) Field of Classification Search
CPC combination set(s) only.
See application file for complete search history.

(56) References Cited

U.S. PATENT DOCUMENTS

| 8,578,465 | B2 * | 11/2013 | Xiao | H04L 63/0236 709/204 |
| 8,949,986 | B2 * | 2/2015 | Ben-Shalom | H04L 63/1441 726/12 |
| 9,264,441 | B2 * | 2/2016 | Todd | G06F 21/53 |
| 9,338,176 | B2 * | 5/2016 | Trumbull | G06F 21/552 |
| 2006/0242701 | A1 * | 10/2006 | Black | H04L 45/00 726/22 |
| 2012/0294158 | A1 * | 11/2012 | Boot | H04L 63/1416 370/252 |

OTHER PUBLICATIONS

Bakshi et al. "Securing cloud from DDOS attacks using Intrusion Detection System in Virtual Machine", 2010 IEEE, pp. 260-264.*

* cited by examiner

*Primary Examiner* — Beemnet Dada
(74) *Attorney, Agent, or Firm* — Blakely, Sokoloff, Taylor & Zafman LLP

(57) ABSTRACT

A method and apparatus for distributed threat detection in a computer network is described. The method may include receiving, by a threat detection system of a first computer network, a request for a service from a threat sensor of a second computer network, the service requested of the threat sensor within the second computer network from a network element of the second computer network. The method may also include emulating the service identified in the request to generate a response to the request, and sending the response to the threat sensor for forwarding to the network element within the second computer network. Furthermore, the method may include analyzing one or more communications between the threat detection system and the network element during emulation of the service requested by the network element to determine whether the network element is a threat to the second network.

23 Claims, 5 Drawing Sheets

SYSTEMS AND METHODS FOR DISTRIBUTED THREAT DETECTION IN A COMPUTER NETWORK

RELATED APPLICATION

The present invention claims priority to U.S. Provisional Patent Application No. 61/965,981 filed Feb. 11, 2014, and incorporates that application by reference in its entirety.

TECHNICAL FIELD

Embodiments of the invention relate to the field of electronic communication, and more particularly, to application of security to computer networks.

BACKGROUND

Computing networks are becoming ubiquitous in enterprises, providing secure and cost-effective access to resources. Those networks usually have a plurality of network devices, such as routers, network switches, wireless access points (AP), firewalls, servers, etc. deployed through the network. The network devices enable the exchange of data and/or services between network devices, as well as with other networks and devices outside of the network. In order to meet the demands of enterprises, an enterprise may deploy multiple physical computing networks at a single location, may logically divide a single network into different network segments, may deploy multiple physical or logical networks at different physical locations, as well as other network deployment configurations.

Not all network content, however, is innocuous or legitimate network content. Due to the extensive use of computer networks by enterprises, there has been a dramatic rise in network attacks, a proliferation of computer viruses, and a constant distribution of other types of malicious content that attempts to attack, infect, or otherwise infiltrate the computer networks. One approach for combating network threats is the deployment of a threat monitoring server within a segment of a computing network. The threat monitoring server is a physical or virtual server deployed in the network segment that emulates a production server within the network. That is, the threat monitoring server emulates a real world server and server applications of a production server within the network segment. By emulation of a production server in a network segment, potentially harmful network content can be routed to, tested, and analyzed within the network segment by the threat monitoring server to detect potential attacks. However, the threat monitoring server only operates in that particular network segment to detect threats to that network segment.

The threat monitoring servers are designed to receive and contain attacks or threats without affecting other production servers on the network. However, deploying threat-monitoring servers in all network segments, in different logical sections of a network, in different physical networks, etc. is costly. It requires many threat monitoring servers running various applications to be deployed on all network segments. Furthermore, additional deployment efforts and cost are required when new network segments are added. This problem is exacerbated in virtualized data centers, where new logical network segments are constantly added and removed.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
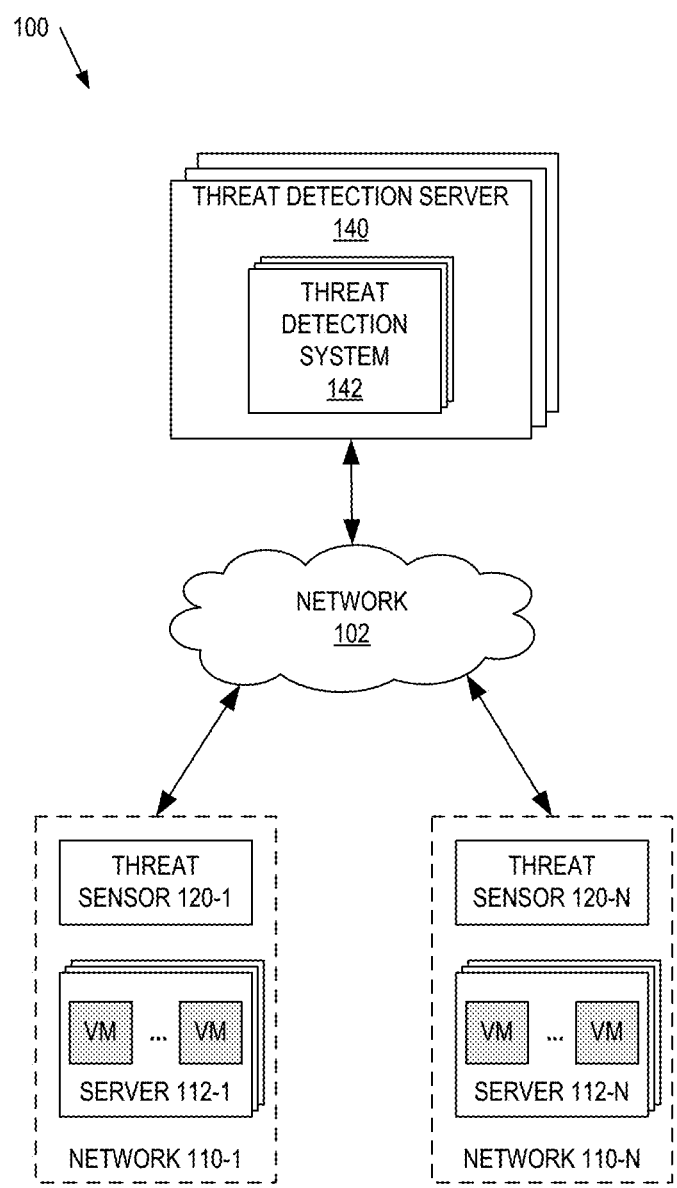
FIG. 1 is a block diagram of exemplary system architecture for distributed threat monitoring in one or more computer networks.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Embodiments for distributed network threat detection is discussed herein. In embodiments, light-weight threat sensors are distributed and deployed in multiple different geographical, physical, and/or logical network segments to receive and forward network traffic to and from a centralized threat detection system. In one embodiment, a threat sensor is deployed and presented in a logical or virtual network segment as a local neighbor on the network segment. The threat sensor may be a virtual server deployed in the network segment or may be a process running in an existing network device, such as a firewall device, router, production server, etc. Furthermore, the threat sensor is assigned one or more network internet protocol (IP) addresses for the network segment. In one embodiment, the threat sensor provides passive services and only responds to service requests that it receives from other network elements. However, because the threat sensor is a passive service provider, and does not provide any production server functions (e.g., data routing, data management, virtual applications, or other services), any service request received by the threat sensors is viewed as a potential attack or probe from an infected network element (e.g., an infected host machine, an infected host process, an infected virtual process or virtual machine, etc.).

In one embodiment, threat sensors are distributed across different physical, logical, and virtual networks, and forward received network requests or probes to a centralized threat detection system. As discussed herein, the unsolicited requests received by threat sensors are treated as potentially malicious and originating from a potentially infected network element. The centralized threat detection system receives and then processes the requests and/or probes. That is, the centralized threat detection system emulates the requested service and interacts with the requestor over a series of message exchanges, analyzes the exchange of messages, and determines whether the network element is infected by a virus, malware, etc.

In one embodiment, the threat detection system may be a server or a cluster of servers in an isolated portion of a network that may be remote from one or more of the threat sensors. The threat sensors therefore coordinate communications between the potentially infected network elements, such as host machines or host processes, and the threat detection system. The coordinated communication is continued until the threat detection system has determined whether or not a network element that initiated an unsolicited request is an actual threat. The centralized threat detection system may interact with any number of physically distributed, logically distributed, and/or virtually distributed threat sensors in parallel to expose the presence of threats in various dynamic and distributed network configurations. However, the typical cost and effort of distributing individual threat monitoring servers to different and new network segments is eliminated.

As discussed in greater detail below, each threat sensor exposes the services of the threat monitoring system to the network segment in which the threat sensor is deployed. In one embodiment, the threat sensor is a virtualized passive server that may be dynamically created or removed, as different logical or virtual network segments are created or removed. Thus, any number of threat sensors may be deployed around data centers, around networks, etc., and communicate potential threats to the threat detection system deployed and managed in a centralized location.

FIG. 1 is a block diagram of exemplary system architecture 100 for distributed threat monitoring in one or more computer networks. System architecture illustrates a plurality of networks including network 102 and network 110-1 through network 110-N. The networks 110-1 through 110-N, as referred to and discussed herein, may run on one or more Local Area Networks (LANs) and may be incorporated into the same geographical, physical, or logical systems, or different geographical, physical, or logical systems. Alternatively, networks 110-1 through 110-N may reside on different LANs, wide area networks, etc. that may be coupled together via a network 102, such as the internet, but separated by firewalls, routers, and/or other network devices operating within their respective physical or logical network segments. It should be noted that various other network configurations can be used including, for example, hosted configurations, distributed configurations, centralized configurations, etc.

The system architecture 100 includes a threat detection server 140, and one or more threat sensors, such as threat sensors 120-1 through 120-N, distributed in networks 110-1 through 110-N. As discussed herein, networks 110-1 through 110-N may be different segments of the same physical network, different logical network segments within the same physical network, different networks provisioned to different organizations, networks distributed across different geographical locations, other network configuration types, as well as a combination of different network configurations. However, in each of the different configurations of network segments, each network segment includes at least one threat sensor.

In one embodiment, each threat sensor performs a process for identifying potential threats within a corresponding network segment. For example, threat sensor 120-1 enables threat detection within network segment 110-1 while threat sensor 120-N enables threat detection within network segment 110-N. In one embodiment, threat sensors may be incorporated into an existing network device, such as a router, firewall, etc., which perform the threat detection functions discussed herein. In another embodiment, a threat sensor, such as threat sensor 120-1, may be executed as an agent or virtual machine (VM) process within an existing network device, such as server 112-1. In yet another embodiment, a threat sensor may be executed as a process within a VM hypervisor (such as VMware ESXi, Citrix Xen, or KVM hypervisors) that supports the virtual machines of server 112-1. Each network segment may include a different deployment of its respective threat sensor, which can be selected based on the topology, performance characteristics, computing resources, etc. associated with that network segment.

In one embodiment, each of threat sensors 120-1 through 120-N is assigned one or more internet protocol (IP) addresses in its associated local network segment (e.g., network segments 110-1 through 110-N). By assigning one or more IP addresses within a network segment, such as network 110-1, threat sensor 120-1 appears to be a local neighboring device, virtual process, service, etc. within network 110-1. However, as discussed above, each of threat sensors 120-1 through 120-N is not a production server or service within their corresponding network segments, and the other network elements operating in the network segments should not seek to contact threat sensors 120-1 through 120-N. When a threat sensor is contacted with a probe, address inquiry, or other unsolicited request from a network element, the contacted threat sensor identifies the requesting network entity and/or traffic as a potential threat within the network segment. The threat sensor then forwards and coordinates communication between the network entity that originated the request and the threat detection system 140, as discussed herein.

Threat detection server 140 is communicatively coupled with each of threat sensors 120-1 through 120-1 via network 102. In one embodiment, threat detection server 140 provides a centralized source for providing the detection of threats within distributed networks 110-1 through 110-N. Threat detection server 140 may include a single server computer system, or a cluster of server computer systems, for providing threat detection system(s) 142. Furthermore, each of the threat detection server(s) 140 can execute one or more threat detection systems 142, with additional threat detection systems 142 dynamically established based on real-time properties. For example, a number of virtualized threat detection systems 142, executed as processes within a virtual environment of the threat detection server(s) 140, may be dynamically provisioned by the threat detection server(s) 140 based on real-time threat conditions within networks 110-1 through 110-N, as well as real-time resource usage at threat detection server(s) 140.

In one embodiment, a threat detection system 142 receives traffic, identified by a threat sensor from an unsolicited request/contact from a network element as potentially malicious network traffic. Threat detection system 142 then emulates the requested service, response, etc. requested by the potentially malicious network traffic. In one embodiment, threat detection system 142 continues the exchange of data with the network element, emulates the requested services, and analyzes the actions of the network element until threat detection system 142 determines that the network element is infected, the traffic is malicious, or no threat is present. When a threat is detected, threat detection system 142 may then notify a network administrator of a corresponding network segment, identify the network element, and/or provide additional identification data to enable the network administrator to take remediative actions to address the identified threat to the network segment.

In one embodiment, when a threat sensor receives unsolicited network traffic from a network element, it may respond to the network element before forwarding the traffic to the threat monitoring server 140, as discussed above. In one embodiment, the unsolicited network traffic may be communicated to the threat sensor using Layer 2 network protocols (e.g., Ethernet protocol), Layer 3 protocols (e.g., IP protocol), Layer 7 protocols (e.g., HTTP). In one embodiment, where the unsolicited message is communicated as Layer 2 protocol traffic, such as Ethernet protocol messages, the receiving threat sensor imitates a local host on the same subnet and responds to, for example, an address response protocol (ARP) messages. In one embodiment, where the unsolicited message is communicated as Layer 3 protocol traffic, such as IP protocol messages, the receiving threat sensor may either perform network address translation, or use a tunnel protocol (such as IP-IP or GRE protocol), to forward the IP traffic to the threat detection server 140. In one embodiment, where the unsolicited message is communicated using encryption protocols, such as SSH, SSL or TLS, the receiving threat sensor performs as an SSH/SSL/TLS proxy to terminate the encrypted connections, and then forwards the traffic to the threat detection server 140 either in clear format, or re-encrypted in a way that will enable threat detection server 140 to decrypt the re-encrypted traffic.

In one embodiment, threat detection server 140 processes multiple connections to the distributed threat sensors (e.g., threat sensors 120-1 through 120-N) at the same time. Thus, a number of threat monitoring servers needed to process ongoing threat detection can be minimized. That is, even when there are attacks happening on multiple network segments at the same time, the local threat sensors can receive and forward the monitored traffic to the centralized threat detection server 140 for processing the threats in parallel. The threat detection server 140 monitors/processes the potentially harmful network traffic from the different network segments at the same time from the centralized location, which eliminates the need to set up duplicated threat monitoring servers in multiple locations.

Figure 2:
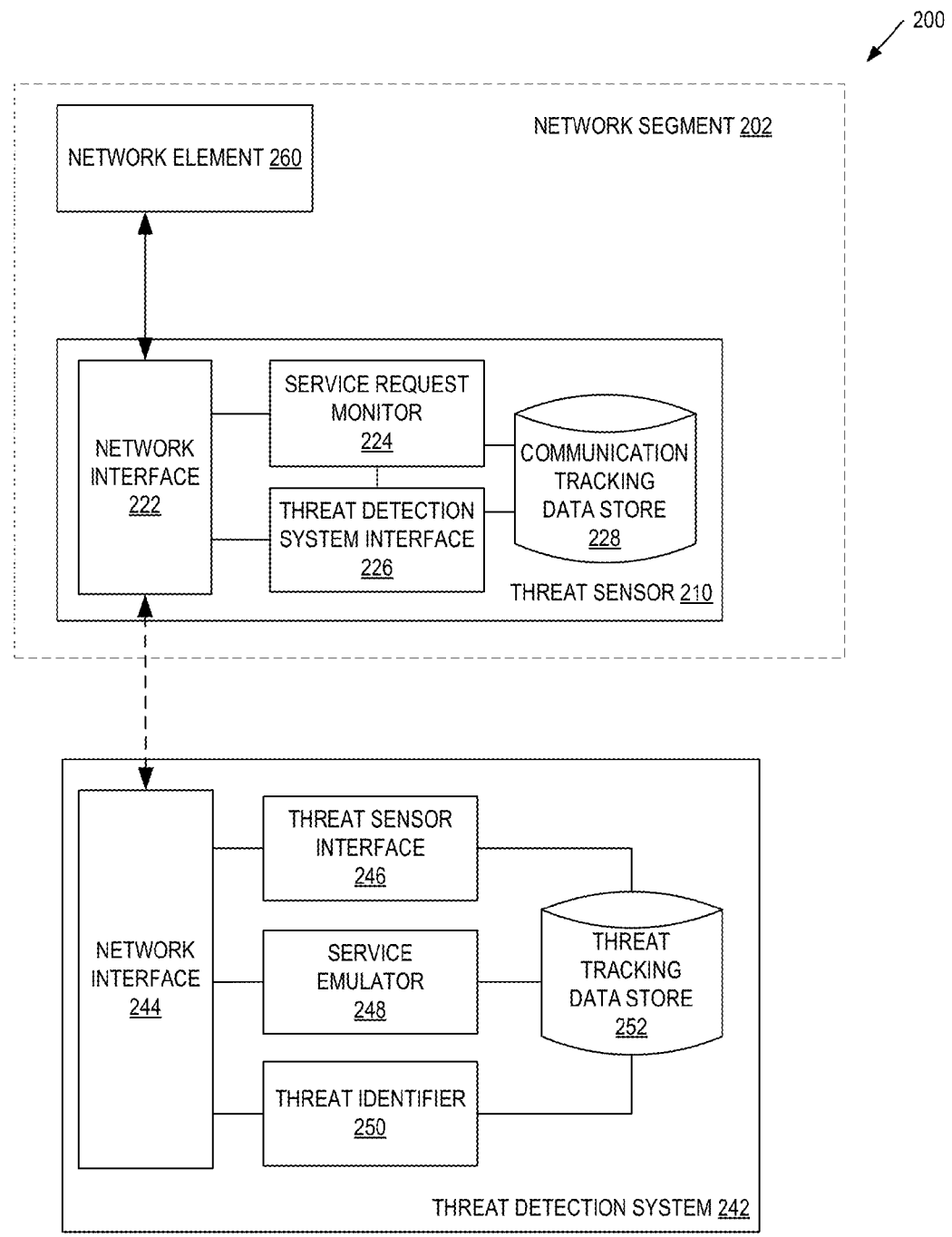
FIG. 2 is a block diagram of one embodiment of a network element, a threat sensor, and a threat detection system.

FIG. 2 is a block diagram of one embodiment 200 of a threat sensor 210, a threat detection system 242, and a network element 260. Threat sensor 210 and threat detection system 242, as illustrated in FIG. 2, provide additional details for threat sensors 110-1 through 110-N and threat detection system(s) 142 discussed above in FIG. 1.

In one embodiment, threat sensor 210 includes a network interface 222, service request monitor 224, threat detection system interface 226, and communication tracking data store 228. In one embodiment, threat sensor 210 may be a virtual machine process executed on a computer system in a segment of a network, a process run by a hypervisor on a computer system in a segment of a network, a process executed on a network device (e.g., a router, firewall, controller, etc.), etc. Furthermore, although only one threat sensor is illustrated, the techniques discussed herein may include a plurality of geographically or logically distributed threat sensors deployed on distributed segments of the same or different computer networks.

In one embodiment, threat detection system 242 includes a network interface 244, threat sensor interface 246, service emulator 248, threat identifier 250, and threat tracking data store 252. Threat detection system 242 may be a process executed on a server computer system. In one embodiment, a plurality of threat detection system processes may be executed in parallel on a single server computer system, or on a cluster of server computer systems, to enable the parallel processing of multiple distributed threats detected in different network segments. In one embodiment, the server computer system, or server cluster, processing potential threats may be centralized at a location remote from the threat sensor 210.

In one embodiment, network element 260 may be an existing device or process operating in network segment 202. Network element 260 may also be a new device or process within the network segment 202. In either case, network element 260 is capable of communicating with other devices and/or processes on the network segment 202, and issues one or more unsolicited requests on the same network segment in which threat sensor 210 is located.

In one embodiment, threat sensor 210 is deployed in network segment 202 and assigned on or more IP addresses within the network segment 202. Furthermore, as discussed herein, threat sensor 210 is passive within the network segment 202, as it does not provide any services typically associated with network production servers. Thus, when threat sensor 260 receives an unsolicited request or probe message from network element 260 via network interface 222, threat sensor service monitor 224 identifies the communication and source of the request as a potential threat.

In one embodiment, service request monitor 224 stores data identifying the request and/or requestor, such as originating IP address, source and destination port number, MAC address, type of request, etc. In one embodiment, service request monitor 224 may respond to network element 260 prior to forwarding the request to threat detection system 242, as discussed above. Threat detection system interface 226 routes the request to threat detection system 242 over a network (e.g., network 102 of FIG. 1) with any appropriate identification data of the requestor. In one embodiment, prior to forwarding the request, threat detection interface 226 may exchange one or more messages with threat sensor interface 246 to initiate a new connection for the exchange and analysis of messages originating from the network element 260.

The original request of network element 260 is then forwarded from threat sensor 210 to threat detection system 242 via network interfaces 222 and 244. Threat sensor interface 246 receives the message and stores relevant identification data and/or configuration data in the threat tracking data store 252. For example, threat sensor interface may store a type of message, protocol associated with the message, identification data associated with the network element 260, identification data associated with the threat sensor 210, etc.

Service emulator 248 of threat detection system 242 then processes the request by emulating the service requested in the message. For example, when the message from network element 260 is to upload files to file storage, service emulator 248 emulates the file storage to store the file, which can be automatically analyzed to detect malware. As another example, service emulator 248 could emulate an SSH server that monitors the SSH activities. The response to the request is then sent from service emulator 248 to threat sensor 210.

Threat sensor 210 receives the threat detection system's 242 response to the request of the network element 260 at threat detection system interface 226. Any additional tracking information is added to communication tracking data store 228 for the present coordinated communication exchange. The response to the threat detection system 242 is then translated, as necessary, and forwarded to the network element 260.

In one embodiment, as discussed above, threat sensor 210 appears as a local neighbor to network element 260. Furthermore, since threat sensor 210 seamlessly coordinates, translates, and forwards the communication, requests and responses between the network element 260 and the threat detection system 242, the network element 260 believes that it is communicating with a local neighbor, and not the remote threat detection system 242. Furthermore, through the continued and coordinated exchange of request and response messages between the network element 260 and the threat detection system 242, threat identifier 250 of the threat detection system 242 is able to analyze an ongoing pattern of the exchange of data with the network element 260 to enable threat detection system 242 to identify sophisticated attack types and patterns.

In one embodiment, the exchange of messages is handled at the threat detection system 242 by service emulator 248. As discussed above, the service emulator may provide a plurality of service options, such as emulated address translation, emulated process server functions, emulated data center processes, emulated handling of data access functions, etc. for handling the potential requests of the network element 260. However, in the event that service emulator 248 is unable to process a requested service of the network element, threat identifier 250 informs threat sensor 210 of the failure. In one embodiment, the threat sensor 210 handles the failure to process the request as an identification of a threat, and one or more remediative actions are initiated, as discussed herein.

Figure 3:
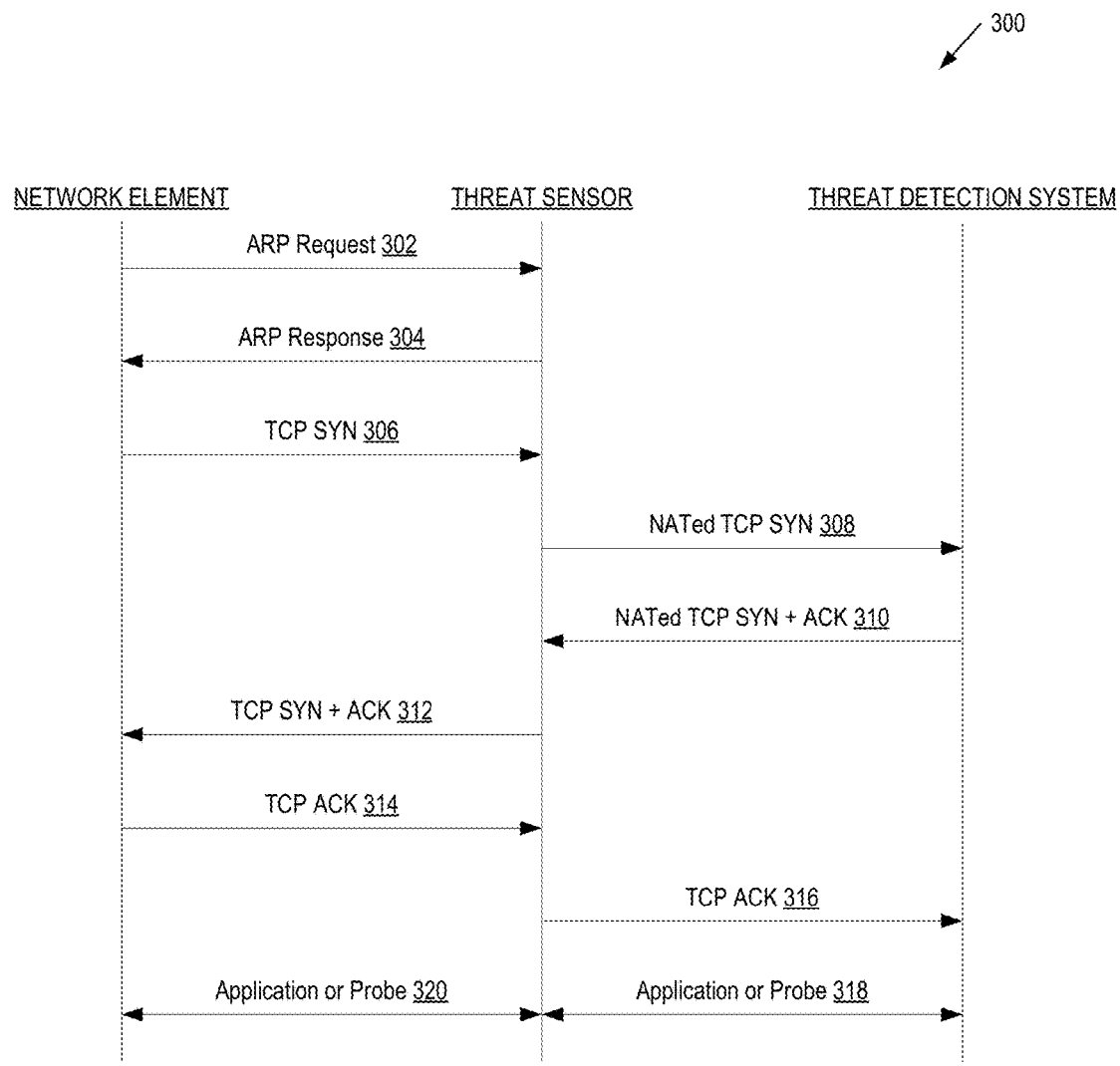
FIG. 3 illustrates an exemplary sequence of communications between a network element, a threat sensor, and a threat detection system.

FIG. 3 illustrates an exemplary sequence of communications 300 between a network element, a threat sensor, and a threat detection system. As discussed herein, threat sensor acts as the local responder for the probe or potential attack traffic from the network element. The probe or potential attack traffic is communicated by the threat sensor to the centralized threat detection system. In one embodiment, the threat sensor is configured as a local entity within a network segment, such as by assigning the threat sensor an IP address, a range of IP addresses, or an IP subnet, in the network segment.

As illustrated in FIG. 3, threat sensor receives 302 and responds 304 to local network scans, probes, or inquiries, such as address resolution protocol (ARP) requests or transmission control protocol (TCP) handshaking. The response 304 ensures that threat sensor appears to behave like a local host in the local network segment of the requesting network element.

After the initial probe and/or request, the requesting network element may try to establish IP connection 306 to the target service/server, which in the scenario of FIG. 3 is the threat sensor. The threat sensor could deny the connection and drop the packets if the requested services are not supported by the threat detection system. If the services are supported, the packets are forwarded 308 to the threat detection system. In one embodiment, the forwarding protocol utilized by threat sensor could include network address translation (NAT), which changes the source IP and port of the forwarding packets to the IP and port of the threat sensor, before forwarding the data packets to the threat detection system. In another embodiment, the forwarding protocol utilized by threat sensor could include tunneling, such as IP-IP or generic routing encapsulation (GRE) protocol, which encapsulates the external IP header on top of the original IP packets.

In either embodiment, once the threat detection system receives the IP packets, the emulation provided by the threat detection system would process and respond 310 to the network traffic, after which the response is translated and returned 312 to the requesting network element. The network element sends an acknowledgement 314 to the threat sensor, which is forwarded 316 to the threat detection system. The threat detection system may then monitor the behaviors of the network element through the exchange of application, service, request, or further probe messaging, illustrated as communications 318 and 320, to determine if the network element's messaging represent an attack/threat or normal traffic.

Though the threat detection system operates in a centralized location, which may be remote from one or more of a plurality of distributed threat sensors, the threat detection system provides services (via emulation) that appear to a requesting network element to be provided from a local server. Thus, the centralized threat detection system is able to monitor many distributed network segments for potential threats. The monitoring is also scalable, and may easily respond to the creation and destruction of network segments, via the distribution of lightweight threat sensors, and not with the distribution and deployment of new servers. That is, a large number of threat sensors can be deployed in numerous and distributed network segments to monitor for network probes or attacks, while deploying a centralized server or server cluster to execute one or more centralized threat detection systems. By separating presence of threat sensors from the server deployment on which the threat detection systems operate, the present embodiments take advantage of a scalable architecture to deploy threat monitoring with a simple management framework.

Figure 4:
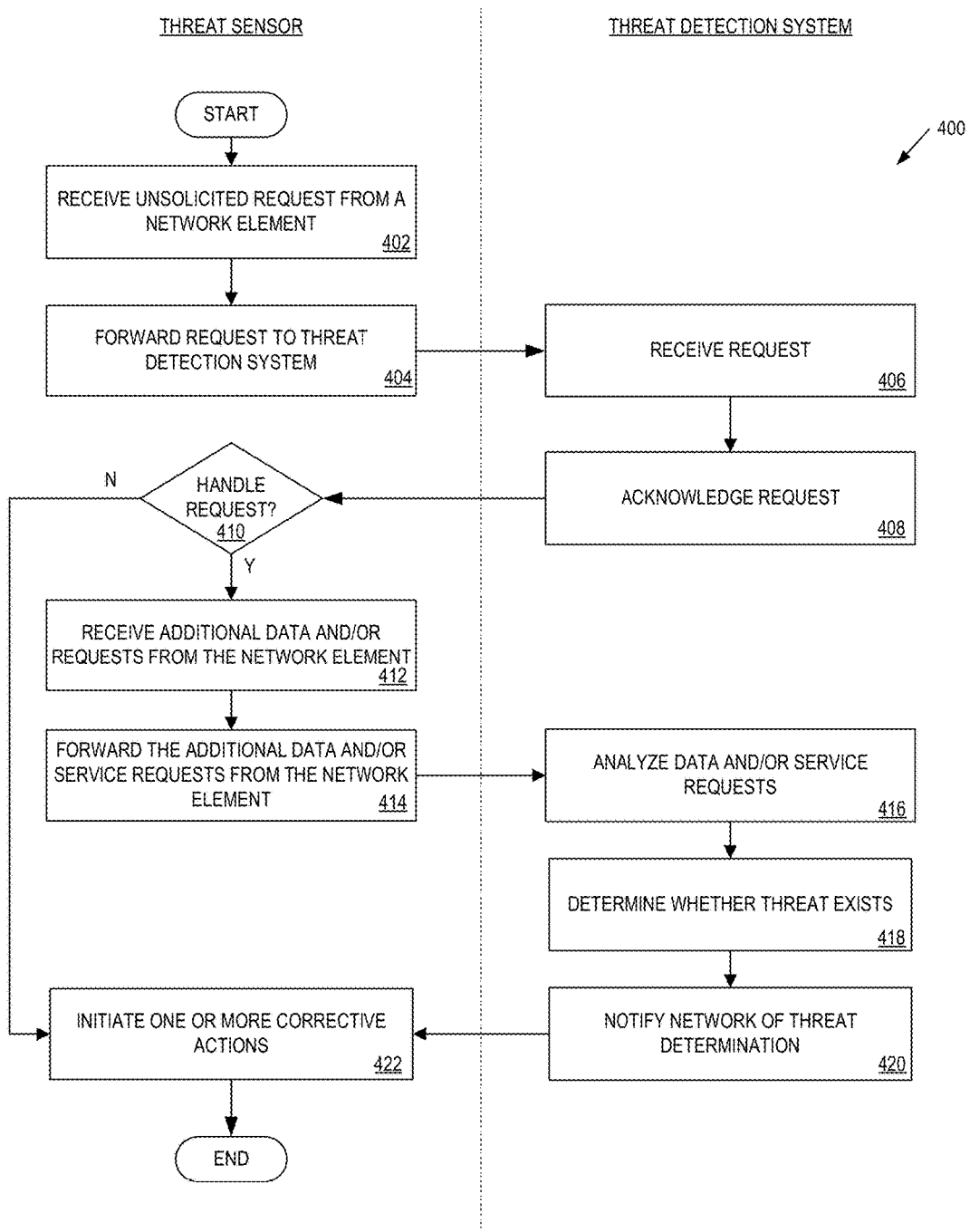
FIG. 4 is a flow diagram of one embodiment of a method for distributed threat detection.

FIG. 4 is a flow diagram of one embodiment of a method for distributed threat detection. The method 400 is performed by processing logic that may comprise hardware (circuitry, dedicated logic, etc.), software (such as is run on a general purpose computer system, networking device, or other dedicated machine), firmware, or a combination. In one embodiment, the method 400 is performed by threat sensor 210 and threat detection system 242 illustrated in FIG. 2, or any of threat sensors 110-1 through 110-N and threat detection system 142 illustrated in FIG. 1.

Referring to FIG. 4, processing logic begins by threat sensor receiving an unsolicited request from a network element (processing block 402). In one embodiment, the request is communicated on a network segment in which the network element and threat sensor are collocated. Threat sensor forwards the request to the threat detection system (processing block 404). As discussed in great detail below, prior to message forwarding, threat sensor may exchange one or more network handshaking or configuration messages with the network element and/or the threat detection system.

Threat detection system receives the request (processing block 406), and acknowledges the request (processing block 408). In one embodiment, where the request includes a request for a particular service, the acknowledgment may indicate whether the threat detection system is able to handle the request.

When the threat detection system is not able to handle the request (processing block 410), processing logic advances to processing block 422 where one or more corrective actions are initiated (processing block 422). In one embodiment, the corrective actions may include dropping the packets of the network element that initiated the request received at processing block 402. In another embodiment, the corrective actions may include notifying a network administrator of the potential threat, a potential identity of the threat, location of the threat, etc. to enable the network administrator to take further actions.

However, when the threat detection system is able to handle the request (processing block 410), the threat sensor receives additional data and/or requests from the network element (processing block 412). The additional data can include further requests and/or probes, requests to access resources, processing requests, etc. These are forwarded to the threat detection system (processing block 414).

The threat detection system then analyzes the data and/or service requests of the network element (processing block 416). In one embodiment, the analysis of the data and/or service requests can include emulating the requested service and the typical responses of the service. By impersonating the requested service, application, etc., threat detection system is able to monitor and analyze the pattern of behavior exhibited by the network element to accurately determine when a threat is present (processing block 418).

The threat detection system notifies the threat sensor of the determination (processing block 420). The determination may reveal that the threat is non-existent, in which case the network element may be cleared. However, because of the original unsolicited request, which is itself suspicious, threat sensor may continue to monitor the network element. The threat sensor may then initiate one or more corrective actions base on the results of the threat determination (processing block 422).

Figure 5:
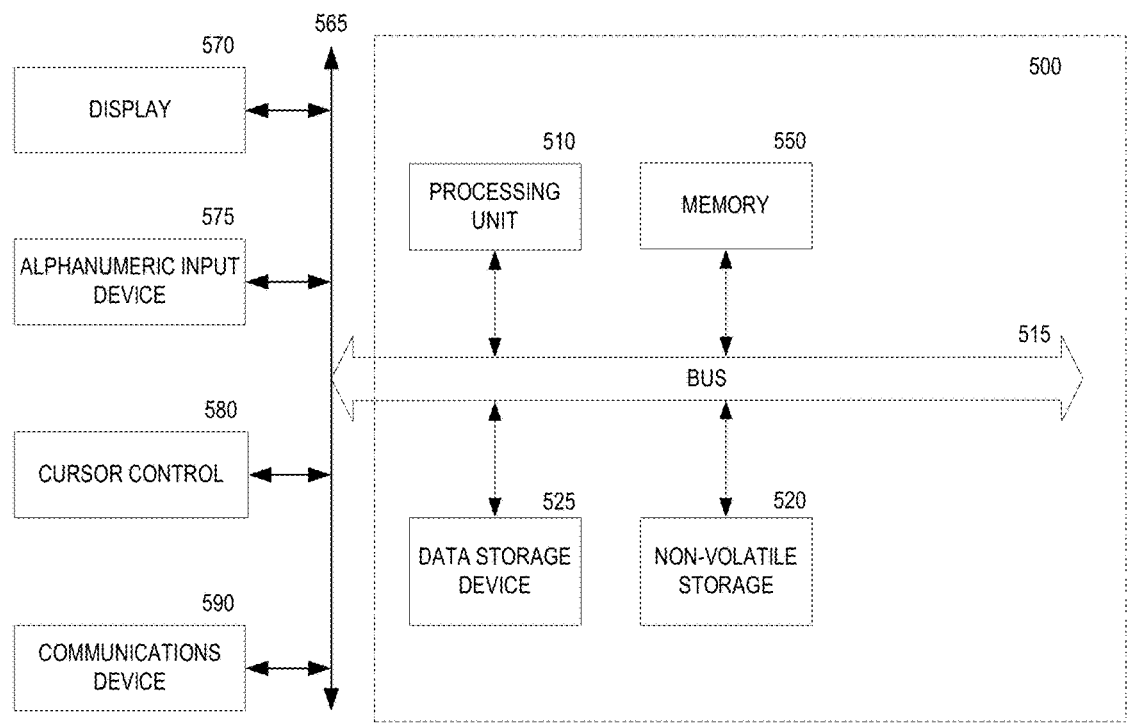
FIG. 5 illustrates a diagrammatic representation of a machine in the exemplary form of a computer system.

FIG. 5 is one embodiment of a computer system that may be used with the present invention. For example, computer systems as discussed in FIG. 5 may be utilized to execute one or more of the threat sensor and/or threat detection system. It will be apparent to those of ordinary skill in the art, however that other alternative systems of various system architectures may also be used.

The computer system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a cathode ray tube (CRT) or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments of the present invention.

It will be appreciated by those of ordinary skill in the art that any configuration of the system may be used for various purposes according to the particular implementation. The control logic or software implementing the present invention can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The present invention may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "emulating", "receiving", "analyzing", "identifying", "determining", "disabling", or the like, refer to the actions and processes of a computer system, or similar electronic computing devices, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A computer-implemented method comprising:
receiving, by a threat detection system of a first computer network, a request for a service forwarded to the threat detection system by a threat sensor sitting on both the first computer network and a second computer network, wherein the threat sensor is a virtual network element that does not provide services in the second computer network, and wherein the service is requested of the threat sensor within the second computer network in an unsolicited request received from a network element of the second computer network, and wherein the network element and the service requested by the network element are identified by the threat sensor and the threat detection system using a combination of identification data including one or more internet protocol (IP) addresses associated with the network element, one or more port numbers associated with the service request, and one or more protocols associated with the communication of the service request;
emulating the service identified in the request forwarded from the threat sensor to the threat detection system to generate a response to the request by the threat detection system in the first computer network;
sending the response from the threat detection system to the threat sensor, the threat sensor to forward the response generated by the threat detection system to the network element within the second computer network based on the combination of identification data;
sending and receiving, by the threat detection system through the threat sensor, one or more communications exchanged with the network element in connection with the emulation of the service by the threat detection system, wherein the threat sensor coordinates the exchange of the one or more communications using the combination of identification data; and
analyzing the one or more communications between the threat detection system and the network element during emulation of the service requested by the network element to determine whether the network element is a threat to the second network.

2. The method of claim 1, wherein the threat sensor and the network element are collocated between the first and the second computer networks, and the first computer network and the second computer network are different computer networks isolated from one another.

3. The computer-implemented method of claim 1, further comprising:
receiving a request for a second service from a second network element of a third computer network by a second threat sensor sitting between the third network and the second computer network, the second threat sensor encapsulates the request packets with an IP header of the second computer network and forwards a tunneling packet within the second computer network to the threat detection system in the first computer network, wherein the first computer network, the second computer network and the third computer network are different computer networks, and wherein the threat detection system analyzes communications with the threat sensor and the second threat sensor for potential threats to their respective computer networks in parallel.

4. The method of claim 3, wherein the first computer network, the second computer network, and the third computer network are different physical computer networks isolated from one another.

5. The method of claim 3, wherein the second computer network and the third computer network are different logical overlay computer networks deployed within the same physical computer network.

6. The method of claim 1, wherein the threat detection system is executed by a server computer system within the first computer network.

7. The method of claim 1, wherein the network element is determined to be a threat to the second network when the communications exchanged between the threat detection system and the threat sensor during emulation of the services requested by the network element are indicative of one or more of an attempt to distribute malicious network content or an attempt to disrupt a computer network service.

8. An article of manufacture having one or more non-transitory computer readable storage media storing executable instructions thereon which when executed cause a system to perform a method comprising:
receiving, by a threat detection system of a first computer network, a request for a service forwarded to the threat detection system by a threat sensor sitting on both the first computer network and a second computer network, wherein the threat sensor is a virtual network element that does not provide services in the second computer network and the service is requested of the threat sensor within the second computer network in an unsolicited request received from a network element of the second computer network, and wherein the network element and the service requested by the network element are identified by the threat sensor and the threat detection system using a combination of identification data including one or more internet protocol (IP) addresses associated with the network element, one or more port numbers associated with the service request, and one or more protocols associated with the communication of the service request;

emulating the service identified in the request forwarded from the threat sensor to the threat detection system to generate a response to the request by the threat detection system in the first computer network;

sending the response from the threat detection system to the threat sensor, the threat sensor to forward the response generated by the threat detection system to the network element within the second computer network based on the combination of identification data;

sending and receiving, by the threat detection system through the threat sensor, one or more communications exchanged with the network element in connection with the emulation of the service by the threat detection system, wherein the threat sensor coordinates the exchange of the one or more communications using the combination of identification data; and analyzing the one or more communications between the threat detection system and the network element during emulation of the service requested by the network element to determine whether the network element is a threat to the second network.

9. The article of manufacture of claim 8, wherein the threat sensor and the network element are collocated between the first and second computer networks, and the first computer network and the second computer network are different computer networks isolated from one another.

10. The article of manufacture of claim 8, further comprising:

receiving a request for a second service from a second network element of a third computer network received by a second threat sensor sitting between the third network and the second computer network, the second threat sensor encapsulates the request packets with an IP header of the second computer network and forwards a tunneling packet within the second computer network to the threat detection system in the first computer network, wherein the first computer network, the second computer network and the third computer network are different computer networks, and wherein the threat detection system analyzes communications with the threat sensor and the second threat sensor for potential threats to their respective computer networks in parallel.

11. The article of manufacture of claim 10, wherein the first computer network, the second computer network, and the third computer network are different physical computer networks isolated from one another.

12. The article of manufacture of claim 10, wherein the second computer network and the third computer network are different logical overlay computer networks deployed within the same physical computer network.

13. The article of manufacture of claim 8, wherein the threat detection system is executed by a server computer system within the first computer network.

14. The article of manufacture of claim 8, wherein the network element is determined to be a threat to the second network when the communications exchanged between the threat detection system and the threat sensor during emulation of the services requested by the network element are indicative of one or more of an attempt to distribute malicious network content or an attempt to disrupt a computer network service.

15. A system, comprising:
a memory; and
a processor coupled with the memory to execute a threat detection system to receive, at a first computer network, a request for a service forwarded to the threat detection system by a threat sensor sitting on both the first computer network and a second computer network, wherein the threat sensor is a virtual network element that does not provide services in the second computer network and the service is requested of the threat sensor within the second computer network in an unsolicited request received from a network element of the second computer network, and wherein the network element and the service requested by the network element are identified by the threat sensor and the threat detection system using a combination of identification data including one or more internet protocol (IP) addresses associated with the network element, one or more port numbers associated with the service request, and one or more protocols associated with the communication of the service request, emulate the service identified in the request forwarded from the threat sensor to the threat detection system to generate a response to the request by the threat detection system in the first computer network, send the response from the threat detection system to the threat sensor, the threat sensor to forward the response generated by the threat detection system to the network element within the second computer network based on the combination of identification data, send and receive, by the threat detection system through the threat sensor, one or more communications exchanged with the network element in connection with the emulation of the service by the threat detection system, wherein the threat sensor coordinates the exchange of the one or more communications using the combination of identification data, and analyze one or more communications between the threat detection system and the network element during emulation of the service requested by the network element to determine whether the network element is a threat to the second network.

16. The system of claim 15, wherein the threat sensor and the network element are collocated between the first and the second computer networks, and the first computer network and the second computer network are different computer networks isolated from one another.

17. The system of claim 15, further comprising:

receiving a request for a second service from a second network element of a third computer network by a second threat sensor sitting between the third network and the second computer network, the second threat sensor encapsulates the request packets with an IP header of the second computer network and forwards a tunneling packet within the second computer network to the threat detection system in the first computer network, wherein the first computer network, the second computer network and the third computer network are different computer networks, and wherein the threat detection system analyzes communications with the threat sensor and the second threat sensor for potential threats to their respective computer networks in parallel.

18. The system of claim 17, wherein the first computer network, the second computer network, and the third computer network are different physical computer networks isolated from one another.

19. The system of claim 17, wherein the second computer network and the third computer network are different logical overlay computer networks deployed within the same physical computer network.

20. The system of claim 15, wherein the threat detection system is executed by a server computer system within the first computer network.

21. The system of claim 15, wherein the network element is determined to be a threat to the second network when the communications exchanged between the threat detection system and the threat sensor during emulation of the services requested by the network element are indicative of one or more of an attempt to distribute malicious network content or an attempt to disrupt a computer network service.

22. The system of claim 2, wherein the threat sensor uses address translation or tunneling for the exchange of the one or more communications between the network element and the threat detection system to decouple the threat detection performed in the first computer network from the second computer network in which the network element is located.

23. The method of claim 3, wherein the threat detection system emulates a plurality of different systems that provide a plurality of different services for different computer networks.

\* \* \* \* \*

UNITED STATES PATENT AND TRADEMARK OFFICE
CERTIFICATE OF CORRECTION

PATENT NO. : 9,621,568 B2  
APPLICATION NO. : 14/480318  
DATED : April 11, 2017  
INVENTOR(S) : Choung-Yaw Shieh Page 1 of 1

It is certified that error appears in the above-identified patent and that said Letters Patent is hereby corrected as shown below:

On the Title Page

Item (71) Applicant, Column 1 please delete the text "Choung-Yaw Michael Shieh" and insert the text --Choung-Yaw Shieh--

Item (72) Inventor, Column 1 please delete the text "Choung-Yaw Michael Shieh" and insert the text --Choung-Yaw Shieh--

Signed and Sealed this  
Eighth Day of May, 2018

Andrei Iancu  
*Director of the United States Patent and Trademark Office*